Nov. 19, 1957 L. GRASSI 2,813,499
TRANSPLANTING MACHINE
Filed July 21, 1951

United States Patent Office 2,813,499
Patented Nov. 19, 1957

2,813,499
TRANSPLANTING MACHINE
Luigi Grassi, Albuzzano, Italy

Application July 21, 1951, Serial No. 237,979

Claims priority, application Italy July 24, 1950

2 Claims. (Cl. 111—3)

This invention relates to rotating devices for the mechanical transplantation of rice plants and other cereals.

An object of the invention is to provide improved transplanting means and the invention achieves this objective by providing apparatus characterized by the fact that it comprises two deformable rotating members, having a portion of their periphery in contact so as to hold by means of pressure the plants to be transplanted and so as to transport these plants along the contacting portion, these plants being released where the peripheries of the two members separate from each other.

Figure 1:
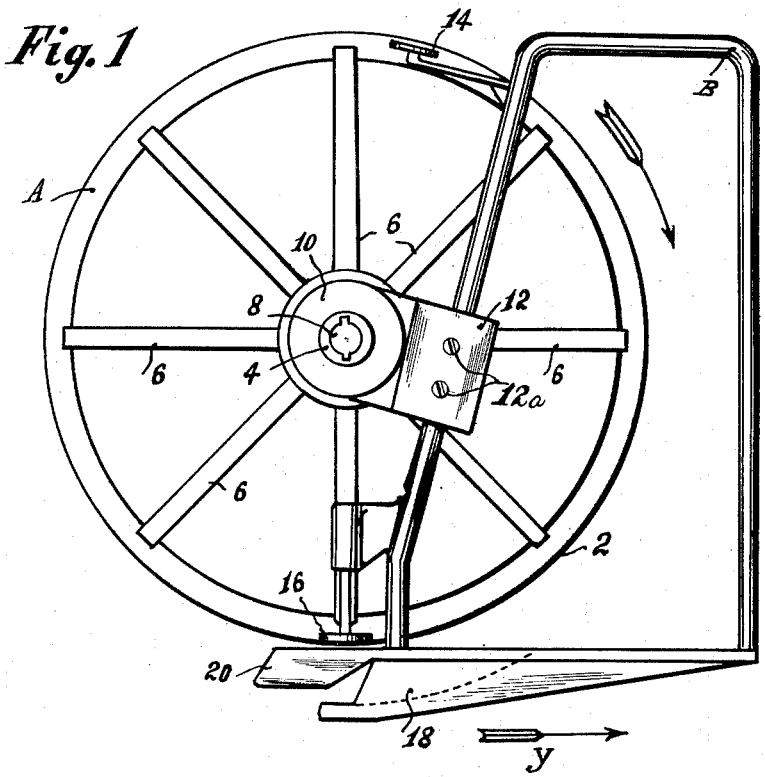
Figure 2:
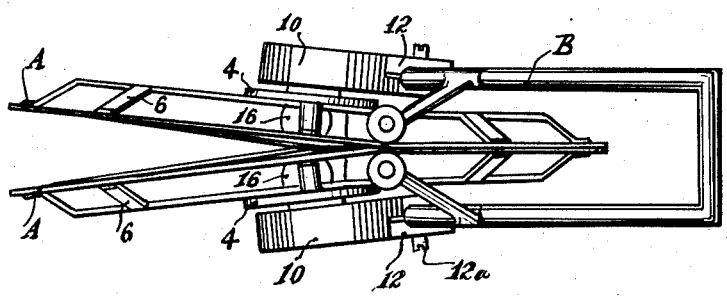

An embodiment of the invention is diagrammatically illustrated in the accompanying drawing in which:

Fig. 1 is a side elevational view of a transplanting device in accordance with the invention; and Fig. 2 is a plan view of the device in Fig. 1.

With reference to the drawing, the device is shown as including two elastic members A, each member being constituted by an elastic metal ring 2 connected to a hub 4 by means of spokes 6 which are also made of elastic material so as to be capable of deformation in their axial planes. Spokes 6 have their outer ends turned inwardly in such a manner as to cause peripheral ring 2 to lie in a plane which is different from that of the spokes.

Each of the hubs 4 is provided with a hole 8 and lengthwise keyways for driving means and is carried by a bracket 10. The bracket 10 is fixed to a rigid frame B constituting the body of the machine by means of pressure plates 12. The plates 12 are adjustable since they are fixed on the frame B by means of set screws 12a. It is thus possible to effect displacement of supports 10 so as to vary at will the angle formed by the axes of the two members A. This angle is controlled in accordance with the pressure which it is necessary to exert between the contacting parts in order to hold the plants without damaging them.

The plants are introduced at the upper part of the device in proximity to the contacting sector, so that by effect of the rotation of the members A in the direction of the arrow X, the plants are caused to be held tightly between the two rings 2 and are thus carried along to the lowermost part of the device. In the embodiment illustrated, the sector of contact extends through an angle of slightly less than 180° and thus each plant is conveyed through a like angle to a point whereat the rings 2 separate so that the plants are deposited in an upright position in the soil.

In order to provide that the plants be positioned in a normal upright position with their roots in the ground, the introduction of the plants at the uppermost part of the device, is effected in an inverted manner. Since the plants are introduced at the tops of the members A, it is possible to introduce the plants by means of a mechanical feeder as well as by the hand of an operator.

In order to delimit more precisely the ends of the contact sector of the two members, auxiliary means are provided, which, in the example illustrated, is constituted by two pairs of idler rollers 14 and 16 supported on the body B. The rollers confine the rings 2 in correspondence with the limits of the contacting portions thereof. The axis of the rollers 14 are included respectively in planes passing through the axis of rotation of the members A. These rollers effectively determine the exact angle of the sector of contact. Both of the members A may be driven at the same peripheral speed, or, alternatively, only one of the members A need be driven since the pressure exerted between the contacting portions of these members will provide a friction drive of the non-driven member.

Members A rotate in the direction of arrow X as aforesaid, whereas the device transverses the ground in the direction indicated by the arrow Y.

As to the cooperation of the rollers 14 and the members A during the functioning of the mechanism, it will be appreciated that the pressure with which the plants are grasped is controlled by the angular displacement of the wheel axles whereas the arc of contact or plant transportation is controlled essentially by the rollers, each function being executed substantially independent of the other function so as to provide a superior type of control.

The device can be attached to any type of vehicle or may be mounted on wheels which can be driven by a source of power supported on the device itself.

The device further comprises a plow share 18 fixed to the lowermost part of frame B and suitably shaped with a central channel so as to open a furrow in the soil transversed so as to facilitate the insertion of the plants from the lower portion of the contacting sector. Behind the plow 18, two wings 20 perform the function of closing the furrow, thus fixing each plant in the earth immediately following the deposit of the plant in the furrow.

The device which has been described is suited for the transplanting of very young and destructible plants as well as for older and more developed plants. The constructional details of the device can be modified without departing from the scope of the invention as defined in the following claims.

What is claimed is:

1. A device for mechanically transplanting rice and like cereals comprising a frame, two deformable rotary elements having mutually inclined axes, means supporting said elements on the frame and permitting selective adjustment of the mutual inclination of said axes, a portion of the peripheries of said elements being in contact during rotation to retain the plants therebetween by pressure and transport them along said portion and to release them where the periphery of each of said elements diverges, pivot pins in planes passing through the axes of said rotary elements, and pressure rollers supported by said pivot pins on said frame at substantially diametrically opposed positions with respect to said rotary elements for guiding the peripheries of said elements into contact for delimiting the portions of the peripheries which make contact, each element comprising a plane resilient peripheral ring, a hub, and a plurality of spokes connecting the ring to the hub, the spokes lying normally in a common conical relationship to the hub and ring and being resilient in an axial direction to permit deformation of the rings along said portions, so that adjustment of said mutual inclination of the axes of rotation serves to vary the pressure of the contact between said rings to accommodate the device for transplanting various grains.

2. A device as in claim 1; further comprising means for driving one of said elements, the other of said elements being driven frictionally by said one element.

References Cited in the file of this patent
UNITED STATES PATENTS

| 2,348,787 | Cordes | May 16, 1944 |
| 2,475,078 | Cherry | July 5, 1949 |
| 2,565,548 | Cordes | Aug. 28, 1951 |

FOREIGN PATENTS

| 65,977 | Demark | Dec. 1, 1947 |
| 984,701 | France | Feb. 28, 1951 |
| 428,538 | Italy | Dec. 22, 1947 |
| 444,270 | Italy | Jan. 17, 1949 |